United States Patent
Fersch et al.

(10) Patent No.: US 11,972,769 B2
(45) Date of Patent: Apr. 30, 2024

(54) METHODS, APPARATUS AND SYSTEMS FOR GENERATION, TRANSPORTATION AND PROCESSING OF IMMEDIATE PLAYOUT FRAMES (IPFS)

(71) Applicant: Dolby International AB, Amsterdam Zuidoost (NL)

(72) Inventors: Christof Fersch, Neumarkt (DE); Daniel Fischer, Fuerth (DE)

(73) Assignee: Dolby International AB, Dublin (IE)

( * ) Notice: Subject to any disclaimer, the term of this patent is extended or adjusted under 35 U.S.C. 154(b) by 438 days.

(21) Appl. No.: 17/270,036

(22) PCT Filed: Aug. 20, 2019

(86) PCT No.: PCT/EP2019/072258
§ 371 (c)(1),
(2) Date: Feb. 21, 2021

(87) PCT Pub. No.: WO2020/038938
PCT Pub. Date: Feb. 27, 2020

(65) Prior Publication Data
US 2021/0335376 A1 Oct. 28, 2021

Related U.S. Application Data

(60) Provisional application No. 62/720,680, filed on Aug. 21, 2018.

(51) Int. Cl.
*G10L 19/16* (2013.01)
*G06F 3/16* (2006.01)

(52) U.S. Cl.
CPC ............ *G10L 19/167* (2013.01); *G06F 3/162* (2013.01); *G06F 3/165* (2013.01)

(58) Field of Classification Search
CPC ...... G10L 19/008; G10L 19/167; G10L 19/24; G06F 3/165; G06F 3/16; G06F 3/162; G06F 16/683
(Continued)

(56) References Cited

U.S. PATENT DOCUMENTS

RE42,728 E * 9/2011 Madrane .............. G11B 27/105
715/721
8,190,441 B2 5/2012 Kincaid
(Continued)

FOREIGN PATENT DOCUMENTS

CN 101103393 A 1/2008
CN 105745704 A 7/2016
(Continued)

OTHER PUBLICATIONS

Fraunhofer Surround Codecs "Surround Codec Background, Technology, and Performance" Release VO.20—Initial Release With Corrections, Audio and Media Technologies, 2013 Fraunhofer Gesellshaft.
(Continued)

*Primary Examiner* — Alexander Krzystan

(57) ABSTRACT

Described herein is an audio decoder for decoding a bitstream of encoded audio data, wherein the bitstream of encoded audio data represents a sequence of audio sample values and comprises a plurality of frames, wherein each frame comprises associated encoded audio sample values, the audio decoder comprising: a determiner configured to determine whether a frame of the bitstream of encoded audio data is an immediate playout frame comprising encoded audio sample values associated with a current frame and additional information; and an initializer configured to initialize the decoder if the determiner determines that the frame is an immediate playout frame, wherein initializing the decoder comprises decoding the encoded audio sample
(Continued)

values comprised by the additional information before decoding the encoded audio sample values associated with the current frame. Described are further a method for decoding said bitstream of encoded audio data as well as an audio encoder, a system of audio encoders and a method for generating said bitstream of encoded audio data with immediate playout frames. Described are moreover also an apparatus for generating immediate playout frames in a bitstream of encoded audio data or for removing immediate playout frames from a bitstream of encoded audio data and respective non-transitory digital storage media.

13 Claims, 9 Drawing Sheets

(58) Field of Classification Search
USPC ........................................ 381/22, 23; 700/94
See application file for complete search history.

(56) References Cited

U.S. PATENT DOCUMENTS

| | | | |
|---|---|---|---|
| 8,218,775 B2 | 7/2012 | Norvell | |
| 8,532,984 B2 | 9/2013 | Rajendran | |
| 9,324,332 B2 | 4/2016 | Doehla | |
| 9,928,845 B2 | 3/2018 | Fischer | |
| 10,595,066 B2* | 3/2020 | Czelhan | ............... H04N 21/242 |
| 2012/0314878 A1 | 12/2012 | Daniel | |
| 2013/0282917 A1 | 10/2013 | Reznik | |
| 2015/0213805 A1 | 7/2015 | Peters | |
| 2016/0155448 A1 | 6/2016 | Purnhagen | |
| 2016/0232910 A1* | 8/2016 | Fischer | ................... G10L 19/24 |
| 2017/0178634 A1 | 6/2017 | Kordon | |
| 2017/0223429 A1 | 8/2017 | Schreiner | |
| 2017/0230693 A1* | 8/2017 | Thoma | .................... H04L 65/70 |
| 2017/0366830 A1 | 12/2017 | Czelhan | |
| 2018/0025738 A1 | 1/2018 | Villemoes | |
| 2018/0197556 A1 | 7/2018 | Fischer | |
| 2018/0227691 A1 | 8/2018 | Chen | |
| 2019/0371351 A1* | 12/2019 | Neuendorf | ............ G10L 19/167 |
| 2020/0195985 A1 | 6/2020 | Thoma | |
| 2021/0335376 A1* | 10/2021 | Fersch | .................. G10L 19/167 |

FOREIGN PATENT DOCUMENTS

| | | |
|---|---|---|
| CN | 107430867 A | 12/2017 |
| IN | 201617011930 A | 8/2016 |
| JP | 2016539357 A | 12/2016 |
| RU | 26511902 C2 | 11/2017 |
| WO | 2014124377 A2 | 8/2014 |
| WO | 2018130577 A1 | 7/2018 |

OTHER PUBLICATIONS

ISO/IEC 14496-3 "Information Technology—Coding of Audio-Visual Objects" Part 3: Audio, Sep. 1, 2009.
Neuendorf, M. et al "Contribution to MPEG-H 3D Audio Version 1" ISO/IEC JTC1/SC29/WG11, Oct. 2013, Geneva Swizerland.

* cited by examiner

METHODS, APPARATUS AND SYSTEMS FOR GENERATION, TRANSPORTATION AND PROCESSING OF IMMEDIATE PLAYOUT FRAMES (IPFS)

CROSS-REFERENCE TO RELATED APPLICATION

This application claims priority of the following priority application: US provisional application 62/720,680, filed 21 Aug. 2018, which is hereby incorporated by reference.

TECHNOLOGY

The present disclosure relates generally to audio encoders, encoding methods, audio decoders and decoding methods, including a method for decoding a bitstream of encoded audio data, wherein the bitstream of encoded audio data represents a sequence of audio sample values and comprises a plurality of frames, wherein each frame comprises associated encoded audio sample values, and a method for generating a bitstream of encoded audio data with immediate playout frames. The present disclosure relates further to an apparatus for generating immediate playout frames in a bitstream of encoded audio data or for removing immediate playout frames from a bitstream of encoded audio data.

While some embodiments will be described herein with particular reference to that disclosure, it will be appreciated that the present disclosure is not limited to such a field of use and is applicable in broader contexts.

BACKGROUND

There is presently a lack in MPEG-4 Audio, as standardized in ISO/IEC 14496-3, Coding of audio-visual objects— Part 3: Audio, for generating, transporting and processing Immediate Playout Frames (IPF). An IPF provides information to a special frame that permits immediately initializing the decoder, and therefore immediate play-out upon switching to a data stream comprising the special frame. Stated in another way, an IPF is a frame where a decoder upon its reception can immediately produce correct samples from the first sample which is encoded into this IPF, as it contains all information to do so. An IPF thus denotes an independently decodable frame which can be decoded using information only from within itself.

Encoded audio usually comes in data frames or chunks. In the context of audio as standardized in MPEG-4, the frames/chunks may be known as granules, the encoded chunks/frames are called access units (AU) and the decoded chunks are called composition units (CU). In transport systems the audio signal may only be accessible and addressable in the granularity of these coded chunks (access units).

In the context of adaptive streaming, when audio switches to a different configuration (e.g., a different bitrate such as a bitrate configured within an adaption set in MPEG-DASH), in order to reproduce the audio samples accurately from the beginning, a decoder needs to be supplied with an $AU_n$ representing the corresponding time-segment of an audio program, and with additional $AU_{n-1}$, $AU_{n-2}$, . . . AUs and configuration data preceding $AU_n$. Otherwise, due to different coding configurations (e.g., Windowing data, SBR-related data, PS related data), it cannot be guaranteed that a decoder produces correct output when decoding only $AU_n$. Therefore, the first $AU_n$ to be decoded with a new configuration has to carry the new configuration data and all the pre-roll data (in form of $AU_{n-x}$, representing time-segments before $AU_n$) that is needed to initialize the decoder with the new configuration. This can be done by means of an Immediate Playout Frame (IPF) as defined in the MPEG-H 3D Audio standard or in the MPEG-D USAC standard.

In view of the above, it is therefore an object of the present invention to provide an audio decoder and a decoding method as well as an audio encoder, a system of audio encoders, an apparatus and an encoding method capable of processing IPFs in MPEG-4 Audio.

SUMMARY

In accordance with a first aspect of the present disclosure there is provided an audio decoder for decoding a bitstream of encoded audio data, wherein the bitstream of encoded audio data represents a sequence of audio sample values and comprises a plurality of frames, wherein each frame comprises associated encoded audio sample values.

The audio decoder may comprise a determiner configured to determine whether a frame of the bitstream of encoded audio data is an immediate playout frame comprising encoded audio sample values associated with a current frame and additional information, wherein the additional information may comprise encoded audio sample values of a number of frames preceding the immediate playout frame, wherein the encoded audio sample values of the preceding frames may be encoded using the same codec configuration as the current frame, wherein the number of preceding frames, corresponding to pre-roll frames, may correspond to the number of frames needed by the decoder to build up the full signal so as to be in a position to output valid audio sample values associated with the current frame whenever an immediate playout frame is decoded.

And the decoder may comprise an initializer configured to initialize the decoder if the determiner determines that the frame is an immediate playout frame, wherein initializing the decoder may comprise decoding the encoded audio sample values comprised by the additional information before decoding the encoded audio sample values associated with the current frame, wherein the initializer may be configured to switch the audio decoder from a current codec configuration to a different codec configuration if the determiner determines that the frame is an immediate playout frame and if the audio sample values of the current frame have been encoded using the different codec configuration, and wherein the decoder may be configured to decode the current frame using the current codec configuration and to discard the additional information if the determiner determines that the frame is an immediate playout frame and if the audio sample values of the current frame have been encoded using the current codec configuration.

In some embodiments, the additional information may further comprise information on the codec configuration used for encoding the audio sample values associated with the current frame, and the determiner may further be configured to determine whether the codec configuration of the additional information is different from the current codec configuration.

In some embodiments, the immediate playout frame may comprise the additional information as an extension payload and the determiner may be configured to evaluate the extension payload of the immediate playout frame.

In some embodiments, the bitstream of encoded audio data may be an MPEG-4 Audio bitstream.

In some embodiments, the additional information may be transported via an MPEG-4 Audio bitstream extension mechanism that is either a Data Stream Element (DSE) or an extension_payload element.

In some embodiments, either the Data Stream Element (DSE) or the extension_payload element may be located at a predefined position in the MPEG-4 Audio bitstream and/or may have a specific instance tag signaling that a payload of the Data Stream Element (DSE) or the extension_payload element is the additional information.

The extension_payload element may, for example, be contained at different places of the MPEG-4 Audio bitstream syntax. Accordingly, this allows to use immediate playout frame functionality also in MPEG-4 Audio.

In some embodiments, the extension_payload element may be contained inside a fill element (ID_FIL).

In some embodiments, the additional information may further comprise a unique identifier, and optionally the unique identifier may be used to detect the different codec configuration.

In some embodiments, the decoder may further comprise a crossfader configured to perform crossfading of output sample values acquired by flushing the decoder in the previous codec configuration and output sample values acquired by decoding the encoded audio sample values associated with the current frame.

In some embodiments, an earliest frame of the number of frames comprised in the additional information may not be time-differentially encoded or entropy encoded relative to any frame previous to the earliest frame and the immediate playout frame may not be time-differentially encoded or entropy encoded relative to any frame previous to the earliest frame of the number of frames preceding the immediate playout frame or relative to any frame previous to the immediate playout frame.

In accordance with a second aspect of the present disclosure there is provided a method for decoding a bitstream of encoded audio data, wherein the bitstream of encoded audio data represents a sequence of audio sample values and comprises a plurality of frames, wherein each frame comprises associated encoded audio sample values.

The method may comprise determining whether a frame of the bitstream of encoded audio data is an immediate playout frame comprising encoded audio sample values associated with a current frame and additional information, wherein the additional information may comprise encoded audio sample values of a number of frames preceding the immediate playout frame, wherein the encoded audio sample values of the preceding frames may be encoded using the same codec configuration as the immediate playout frame, wherein the number of preceding frames, corresponding to pre-roll frames, may correspond to the number of frames needed by a HI decoder to build up the full signal so as to be in a position to output valid audio sample values associated with the current frame whenever an immediate playout frame is decoded.

The method may further comprise initializing the decoder if it is determined that the frame is an immediate playout frame, wherein the initializing may comprise decoding the encoded audio sample values comprised by the additional information before decoding the encoded audio sample values associated with the current frame.

The method may further comprise switching the audio decoder from a current codec configuration to a different codec configuration if it is determined that the frame is an immediate playout frame and if the audio sample values of the immediate playout frame have been encoded using the different codec configuration.

And the method may comprise decoding the immediate playout frame using the current codec configuration and discarding the additional information if it is determined that the frame is an immediate playout frame and if the audio sample values of the immediate playout frame have been encoded using the current codec configuration.

Configured as proposed, the method allows, for example, switching of AudioObjectTypes (AOT) as defined in ISO/IEC 14496-3 in combination with continuously producing correct output samples and without introducing gaps of silence in the audio output.

In some embodiments, the additional information may further comprise information on the codec configuration used for encoding the audio sample values associated with the current frame, wherein the method may further comprise determining whether the codec configuration of the additional information is different from the current codec configuration used to encode audio sample values associated with frames in the bitstream preceding the immediate playout frame.

In some embodiments, the bitstream of encoded audio data may be an MPEG-4 Audio bitstream.

In some embodiments, the additional information may be transported via an MPEG-4 Audio bitstream extension mechanism that is either a Data Stream Element (ID_DSE) or an extension_payload element.

In some embodiments, either the Data Stream Element (ID_DSE) or the extension_payload element may be located at a predefined position in the MPEG-4 Audio bitstream and/or may have a specific instance tag signaling that a payload of the Data Stream Element (ID_DSE) or the extension_payload element is the additional information.

In some embodiments, the extension_payload element may be contained inside a fill element (ID_FIL).

In some embodiments, the additional information may further comprise a unique identifier, and optionally the unique identifier may be used to detect the different codec configuration.

In some embodiments, the bitstream of encoded audio data may comprise a first number of frames encoded using a first codec configuration and a second number of frames following the first number of frames and encoded using a second codec configuration, wherein the first frame of the second number of frames may be the immediate playout frame.

In accordance with a third aspect of the present disclosure there is provided an audio encoder for generating a bitstream of encoded audio data with immediate playout frames, wherein the bitstream of encoded audio data represents a sequence of audio sample values and comprises a plurality of frames, wherein each frame comprises associated encoded audio sample values.

The audio encoder may comprise a core encoder configured to encode uncompressed audio sample values associated with the plurality of frames using a predefined codec configuration.

The audio encoder may further comprise a buffer configured to store encoded audio sample values of a number of preceding frames of a current frame of the plurality of frames encoded using the predefined codec configuration.

And the audio encoder may comprise an embedder configured to write an immediate playout frame in the current frame of the plurality of frames, wherein the immediate playout frame may comprise encoded audio sample values associated with said current frame and additional information corresponding to the encoded audio sample values of the number of preceding frames of said current frame.

In some embodiments, the embedder may further be configured to include information on the predefined codec configuration in the additional information.

In some embodiments, the embedder may further be configured to include in the immediate playout frame the additional information.

In some embodiments, the generated bitstream of encoded audio data may be an MPEG-4 Audio bitstream.

In some embodiments, the embedder may further be configured to embed the additional information in the bitstream via an MPEG-4 Audio bitstream extension mechanism that is either a Data Stream Element (ID_DSE) or an extension_payload element.

In some embodiments, the embedder may further be configured to locate either the Data Stream Element (ID_DSE) or the extension_payload element at a predefined position in the MPEG-4 Audio bitstream and/or to assign a specific instance tag signaling that a payload of the Data Stream Element (ID_DSE) or the extension_payload element is the additional information.

In some embodiments, the embedder may further be configured to embed the extension_payload element inside a fill element (ID_FIL).

In some embodiments, the embedder may further be configured to include a unique identifier into the additional information, and optionally the unique identifier may signal the predefined codec configuration.

In some embodiments, the audio encoder may further be configured to not time-differentially encode or entropy encode an earliest frame of the number of frames comprised in the additional information relative to any frame previous to the earliest frame and the audio encoder may further be configured to not time-differentially encode or entropy encode the immediate playout frame relative to any frame previous to the earliest frame of the number of frames preceding the immediate playout frame or relative to any frame previous to the immediate playout frame.

In accordance with a fourth aspect of the present disclosure there is provided a system comprising two or more audio encoders for generating a plurality of bitstreams of encoded audio data each having immediate playout frames, wherein each bitstream of encoded audio data represents a sequence of audio sample values and comprises a plurality of frames, and wherein each frame comprises associated encoded audio sample values.

In some embodiments, a predetermined sampling rate may be the same for each of the core encoders of the two or more audio encoders. Accordingly, resampling and additional delay handling at the decoder can be avoided.

In some embodiments, the system may further comprise a delay alignment unit for delay aligning the plurality of bitstreams. Accordingly, this allows for seamless switching at the decoder by compensating for different encoder delays.

In accordance with a fifth aspect of the present disclosure there is provided a method of generating, by an audio encoder, a bitstream of encoded audio data with immediate playout frames, wherein the bitstream of encoded audio data represents a sequence of audio sample values and comprises a plurality of frames, wherein each frame comprises associated encoded audio sample values.

The method may comprise the step of encoding, by a core encoder, uncompressed audio sample values associated with the plurality of frames using a predefined codec configuration.

The method may further comprise the step of storing, by a buffer, encoded audio sample values of a number of preceding frames of a current frame of the plurality of frames encoded using the predefined codec configuration.

And the method may comprise the step of writing, by an embedder, an immediate playout frame in the current frame of the plurality of frames, wherein the immediate playout frame may comprise encoded audio sample values associated with said current frame and additional information corresponding to the encoded audio sample values of the number of preceding frames of said current frame.

In some embodiments, the additional information may further comprise information on the predefined codec configuration.

In some embodiments, the immediate playout frame may further comprise the additional information.

In some embodiments, the generated bitstream of encoded audio data may be an MPEG-4 Audio bitstream.

In some embodiments, the additional information may be embedded in the bitstream, by the embedder, via an MPEG-4 Audio bitstream extension mechanism that may be either a Data Stream Element (ID_DSE) or an extension_payload element.

In some embodiments, either the Data Stream Element (ID_DSE) or the extension_payload element may be located, by the embedder, at a predefined position in the MPEG-4 Audio bitstream and/or may be assigned a specific instance tag signaling that a payload of the Data Stream Element (ID_DSE) or the extension_payload element is the additional information.

In some embodiments, the extension_payload element may be embedded, by the embedder, inside a fill element (ID_FIL).

In some embodiments, the additional information may further comprise a unique identifier, and optionally the unique identifier may signal the predefined codec configuration.

In some embodiments, by the audio encoder, an earliest frame of the number of frames comprised in the additional information may not be time-differentially encoded or entropy encoded relative to any frame previous to the earliest frame and, by the audio encoder, the immediate playout frame may not be time-differentially encoded or entropy encoded relative to any frame previous to the earliest frame of the number of frames preceding the immediate playout frame or relative to any frame previous to the immediate playout frame.

In accordance with a sixth aspect of the present disclosure there is provided an apparatus for generating immediate playout frames in a bitstream of encoded audio data or for removing immediate playout frames from a bitstream of encoded audio data, wherein the bitstream of encoded audio data represents a sequence of audio sample values and comprises a plurality of frames, wherein each frame comprises associated encoded audio sample values.

The apparatus may comprise a receiver configured to receive a bitstream of encoded audio data, wherein the bitstream of encoded audio data represents a sequence of audio sample values and comprises a plurality of frames, wherein each frame comprises associated encoded audio sample values.

And the apparatus may comprise an embedder configured to write an immediate playout frame in a current frame of the plurality of frames, wherein the immediate playout frame may comprise encoded audio sample values associated with said current frame and additional information corresponding to encoded audio sample values of a number of preceding frames of said current frame.

Configured as proposed, the apparatus allows to individually generate immediate playout frames in any already existing bitstreams of encoded audio data, i.e. prior to distribution if needed.

In some embodiments, the apparatus may further comprise a buffer configured to store encoded audio sample values of the number of preceding frames of the current frame of the plurality of frames.

In some embodiments, the embedder may further be configured to remove, from the immediate playout frame, the additional information corresponding to the encoded audio sample values of the number of preceding frames of said current frame.

Accordingly, this allows to individually remove immediate playout frames from a bitstream of encoded audio data, for example, in a case where an audio encoder generates immediate playout frames only.

In accordance with a seventh aspect of the present disclosure there is provided a non-transitory digital storage medium having a computer program stored thereon to perform a method for decoding a bitstream of encoded audio data, wherein the bitstream of encoded audio data represents a sequence of audio sample values and comprises a plurality of frames, wherein each frame comprises associated encoded audio sample values, when said computer program is run by computer or a processor.

In accordance with an eighth aspect of the present disclosure there is provided a non-transitory digital storage medium having a computer program stored thereon to perform a method of generating, by an audio encoder, a bitstream of encoded audio data with immediate playout frames, wherein the bitstream of encoded audio data represents a sequence of audio sample values and comprises a plurality of frames, wherein each frame comprises associated encoded audio sample values, when said computer program is run by a computer or a processor.

BRIEF DESCRIPTION OF THE DRAWINGS

Example embodiments of the disclosure will now be described, by way of example only, with reference to the accompanying drawings in which.

DETAILED DESCRIPTION

Figure 1:
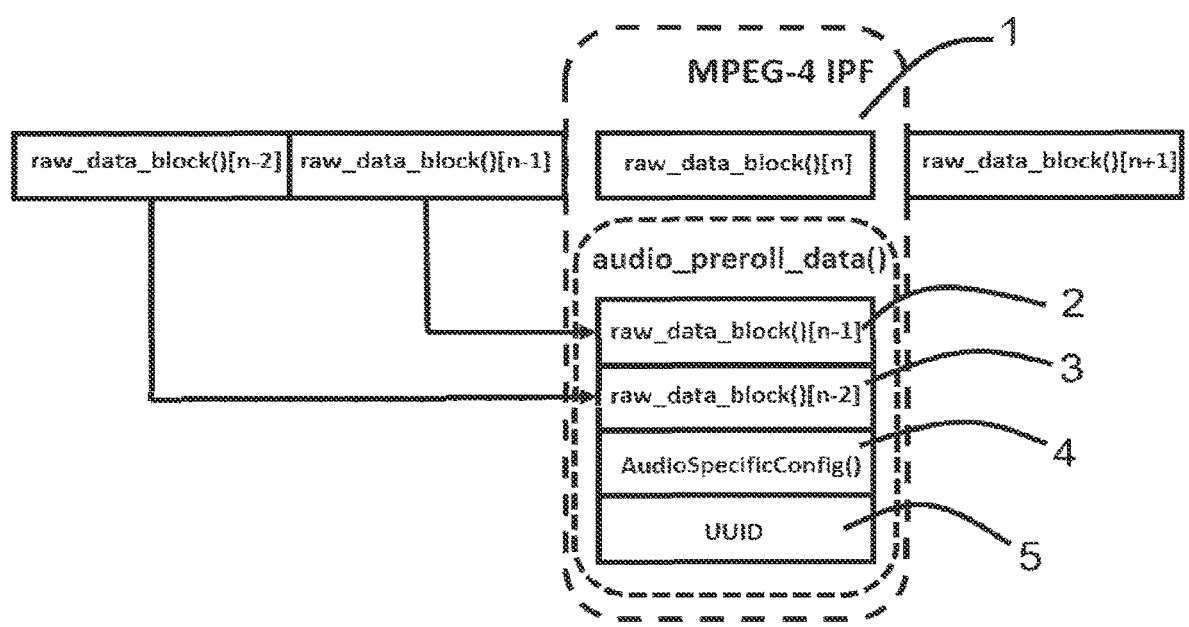
FIG. 1 illustrates an example of an immediate playout frame in an MPEG-4 Audio bitstream of encoded audio data.

The present invention relates to the creation (encoding), transportation (bitstream) and processing (decoding) of IPFs in MPEG-4 Audio, such as in the context of a data stream including audio standardized in accordance with another standard, such as the MPEG-H 3D audio standard. Here and in the following, MPEG-4 Audio bitstreams may refer to bitstreams compatible with the standard set out in ISO/IEC 14496-3, Coding of audio-visual objects—Part 3: Audio, and all future editions, revisions and amendments thereto ("hereinafter MPEG-4 Audio"). In order to enable IPF functionality in MPEG-4 Audio, there are several options for generating and transporting AUs and configuration data preceding $AU_n$ in time as part of the same payload packet as used for $AU_n$. This is done in order to enable correct output of audio samples from the first sample resulting from decoding $AU_n$.

A bitstream of encoded audio data may contain a sequence of audio sample values, e.g. payload packets. The bitstream of encoded audio data may further comprise a plurality of frames. Each frame may comprise associated encoded audio sample values. In other words, each payload packet may belong to a respective frame or AU.

In one example, an audio payload packet may conform to the following syntax as defined in ISO/IEC 14496-3:

```
raw_data_block( ) {
    while( (id = id_syn_ele) != ID_END ){ 3 uimsbf
        switch (id) {
            case ID_SCE: single_channel_element( ); break;
            case ID_CPE: channel_pair_element( ); break;
            case ID_CCE: coupling_channel_element( ); break;
            case ID_LFE: lfe_channel_element( ); break;
            case ID_DSE: data_stream_element( ); break;
            case ID_PCE: program_config_element( ); break;
            case ID_FIL: fill_element( );
        }
    }
    byte_align( )
}
```

The above audio payload packet may be compatible with the present and future versions of the MPEG standard such as the MPEG-4 Audio standard. In an embodiment, the bitstream of encoded audio data may be an MPEG-4 Audio bitstream (i.e. MPEG-4 Audio standard compliant bitstream).

A frame of the bitstream of encoded audio data may be an immediate playout frame (random access point, special frame) comprising encoded audio sample values associated with a current frame and additional information. The additional information may comprise encoded audio sample values of a number of frames preceding the immediate playout frame, wherein the encoded audio sample values of the preceding frames may be encoded using the same codec configuration as the current frame. The number of preceding frames, corresponding to pre-roll frames, may correspond to the number of frames needed by the decoder to build up the full signal so as to be in a position to output valid audio sample values associated with the current frame whenever an immediate playout frame is decoded. The full signal may, for example, be built up during start-up or restart of the decoder. The immediate playout frame may be, for example, the first frame upon start-up of the decoder.

In an embodiment, the additional information may be transported via an MPEG-4 Audio bitstream extension mechanism that may be either a Data Stream Element (ID_DSE) or an extension_payload element. The extension_payload element may, for example, be contained at different places of the MPEG-4 Audio bitstream syntax, e.g. at different levels. In an embodiment, the extension_payload element may be contained inside a fill element (ID_FIL).

The additional information may thus be transported via an MPEG-4 Audio bitstream extension mechanism, for example, based on one of the following options:

Option 1:
raw_data_block( )->case ID_DSE->data_stream_element( )->data_stream_byte[element_instance_tag][i];

Option 2:
raw_data_block( )->case ID_FIL->fill element( )->extension_payload(cnt)->switch(extension_type)->extension_type==EXT_DATA_ELEMENT (+convention how to identify) or EXT_AUDIO_PRE_ROLL Option 3:
er_raw_data_block( ) or er_raw_data_block_eld( )->extension_payload(cnt)->switch(extension_type)->extension_type==EXT_DATA_ELEMENT (+convention how to identify) or EXT_AUDIO_PRE_ROLL A Data Stream Element (signaled via id_syn_ele equal to ID_DSE) or a fill element (signaled via id_syn_ele equal to ID_FIL), or equivalents thereof, as defined in ISO/IEC 14496-3 and/or future standards, may be used to carry extension payloads, which may be used to further extend the information which is transported in such a payload packet without breaking compatibility to legacy decoders.

Therefore, in the MPEG-4 Audio context, either a Data Stream Element (ID_DSE) or an extension_payload element which may be contained inside a fill element (ID_FIL) may be used in order to transport AUs and configuration information which are representing time-segments before $AU_n$ (i.e. additional information) within the same payload packet as $AU_n$ (i.e. current frame, immediate playout frame). This can further be used to apply processing which allows to use IPF functionality also in MPEG-4 Audio. Similarly, as in MPEG-D USAC, where the extension mechanism (usacExtElement) can be used to convey AudioPreRoll( ) payload, but with some differences.

In an embodiment, an extension element (e.g. extension_payload element) may be inserted into an AU, where the element type is signaled in the bitstream for each element and AU. In one example, the extension element may be the first element in a payload packet, preceding the first audio element.

Each audio pre-roll element defined below may be identified by a Universally Unique Identifier (UUID). The UUID field may be used to signal by an audio encoder and detect by an audio decoder a switch of stream configurations. If the UUID field has changed relative to the previous frame or initial state (e.g. at first decoder startup) the stream configuration might have changed and the pre-roll payload must be evaluated to ensure correct decoding. If the UUID does not change relative to the previous frame, the decoder may skip the audio_preroll_element( ) payload and proceed with regular decoding.

In one example, if no UUID is present, the decoder may compare the AudioSpecificConfig of the audio_preroll_element( ) with the current decoder configuration to detect a stream configuration switch.

The field 'flags' is used as an 8-bit bitset that may be used to signal additional information to the decoder. This may be information on whether a crossfade shall be applied or the type of crossfade (e.g., linear, logarithmic). In the example below one bit is used to signal whether either the pre-roll payload or UUID are present or are not present in the bitstream.

The stream configuration must be known to the decoder before processing any AU. In MPEG-4 Audio, the decoder configuration is conveyed in the AudioSpecificConfig-element. Decoder configuration and UUID are part of the pre-roll payload. Further, the pre-roll payload comprises a configuration dependent number of MPEG-4 Audio AUs (raw_data_block).

An Immediate Playout Frame (IPF) in MPEG-4 may comprise exactly one audio_preroll_element( ) payload as described below and one or several audio element streams (e.g. single_channel_element( )) defined in ISO/IEC 14496-3. The audio elementary element streams are associated with the current timestamp. Pre-roll payload may be carried in one of the extension payload mechanisms of MPEG-4 Audio.

FIG. 1 shows an Immediate Playout Frame ($AU_n$) 1 comprising two pre-roll frames ($AU_{n-1}$, $AU_{n-2}$) 2, 3 as well as corresponding stream configuration 4 (AudioSpecificConfig) and Stream Identifier 5 (UUID).

An Audio Pre-roll element may be defined based on the following:

```
audio_preroll_element( ) {
    flags; 8 uimbsf
    if((flags & 0x01) == 1)
        uuid; 128 uimbsf
    if((flags & 0x02) == 0) return; // No payload present
    asc_size = bs_asc_size; 8 uimbsf
    if(asc_size == 255)
        asc_size += esc; 8 uimbsf
    AudioSpecificConfig( ); asc_size * 8
    n_preroll_frames; 8 uimbsf
    for(f = 0; f < n_preroll_frames; ++f) {
        au_size = bs_au_size; 8 uimbsf
        if(au_size == 255)
            au_size += esc; 8 uimbsf
        raw_data_block( ); au_size * 8
    }
}
```

| | |
|---|---|
| flags | Flags controlling, e.g., crossfade etc. flags & 0x02 used to indicate whether payload is present |
| uuid | Universally Unique Identifier, aka Stream-ID in MPEG-D. Used to signal configuration change (stream switching). Payload shall be decoded if uuid changes from previous frame |
| asc_size | Size of AudioSpecificConfig( ) in bytes. |
| n_preroll_frames | Number of audio pre-roll frames |
| au_size | Size of the AU to follow in bytes |

In one example the audio pre-roll element (e.g., audio_preroll_element( )) is byte aligned and can therefore be transmitted without further byte-alignment by both extension_payload element (e.g. inside a fill element) and Data Stream Element.

In one example, the IPF relates to the pre-roll element as follows: IPFs include both the current AU, and the additional AUs (i.e. the number of preceding frames) which are needed for decoding correctly. The additional AUs are packaged as part of the pre-roll element, which in turn is packaged into the raw_data_block( ) (via ID_DSE or ID_FIL). Such a raw_data_block can be the IPF.

An IPF may be encoded via various methods. In one example, a pre-roll frame must be independently decodable, e.g. if SBR is used the SBR header must be present. In an embodiment, the audio_preroll_element( ) may be encapsulated in a Data Stream Element. For example, the audio_preroll_element( ) may be encapsulated in a data stream element based on the following syntax:

```
data_stream_element( ) {
    element_instance_tag; 4 uimsbf
    data_byte_align_flag; 1 uimsbf
    cnt = count; 8 uimsbf
    if (cnt == 255)
        cnt += esc_count; 8 uimsbf
    if (data_byte_align_flag)
        byte_alignment( );
    for (i = 0; i < cnt; i++)
        data_stream_byte[element_instance_tag][i]; 8 uimsbf
}
```

| | |
|---|---|
| element_instance_tag | A number to identify the data stream element. Must be handled with care if multiple DSEs are present. |
| cnt | Size of the audio_preroll_element( ) in bytes (0 if no IPF) |
| data_stream_byte | Audio Preroll payload, i.e. audio_preroll_element( ) |

A convention may be used to identify the Data Stream Element (ID_DSE) that carries an audio_preroll_element( ). In an embodiment, the ID_DSE may be located at a pre-defined position in the stream and/or may have a specific instance tag, signaling that the payload is an audio_preroll_element( ).

In another embodiment, the audio_preroll_element( ) may be encapsulated in an extension_payload element inside a fill element. For example, the audio_preroll_element( ) may be encapsulated based on the following syntax:

```
fill_element( ) {
    cnt = count; 4 uimsbf
    if (cnt == 15)
        cnt += esc_count - 1; 8 uimsbf
    while (cnt > 0) {
        cnt-= extension_payload(cnt);
    }
}
```

| | |
|---|---|
| count | Size of Audio Pre-roll Element in bytes (0 if no IPF) |
| extension_payload | Extension payload element, carrying audio_preroll_element( ). Currently used to transmit e.g. SBR data, fill bytes. Extension type could be "EXT_DATA_ELEMENT" or newly defined element type, e.g. "EXT_AUDIO_PRE_ROLL". |

As in the previous example, a convention may be used to identify the type of an extension_payload element, such as that if the EXT_DATA_ELEMENT is conveyed at a certain pre-defined position in a payload packet, then the payload is an audio_preroll_element( ). Therefore, in an embodiment, the extension_payload element may be located at a pre-defined position in the stream and/or may have a specific instance tag, signaling that the payload is an audio_preroll_element( ).

In one example, an extension payload in accordance with the present invention may be signaled using a new extension payload type, e.g. extension_type=EXT_AUDIO_PRE_ROLL=1010b.

```
extension_payload(cnt) {
    extension_type; 4 uimsbf
    align = 4;
    switch( extension_type ) {
        case EXT_AUDIO_PRE_ROLL:
            // Always byte-aligned, do not modify align
            audio_preroll_element( );
            break;
        [...]
```

In one example, the Data Stream Element (ID_DSE) or the extension_payload element (e.g. inside the fill element (ID_FIL)) carrying the audio_preroll_element( ) may be embedded into the bitstream before any audio element in the same payload packet. Some examples of embedding the IPF payload in such manner include:

Mono: <ID_(DSE|FIL)><ID_SCE> . . . <ID_END>

5.1: <ID_(DSE|FIL)><ID_SCE><ID_CPE><ID_ CPE><ID_LFE> . . . <ID_END>

Figure 2:
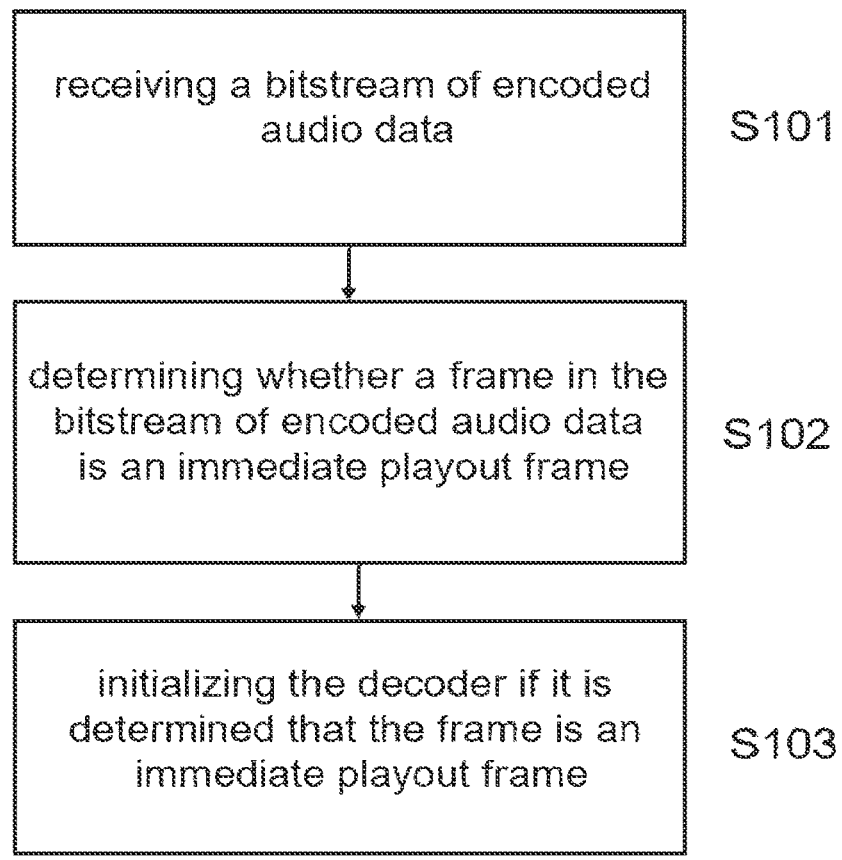
FIG. 2 illustrates an example of a method for decoding a bitstream of encoded audio data, wherein the bitstream of encoded audio data represents a sequence of audio sample values and comprises a plurality of frames, wherein each frame comprises associated encoded audio sample values.

An aspect of the present invention relates to decoding of an IPF. Referring to the example of FIG. 2, the decoding process may include the step S101 of receiving a bitstream of encoded audio data. The bitstream of encoded audio data may represent a sequence of audio sample values and may comprise a plurality of frames, wherein each frame may comprise associated encoded audio sample values.

The method may further include the step S102 of determining whether a frame of the bitstream of encoded audio data is an immediate playout frame. The immediate playout frame may comprise encoded audio sample values associated with a current frame and additional information. The additional information may comprise encoded audio sample values of a number of frames preceding the immediate playout frame, the encoded audio sample values of the preceding frames being encoded using the same codec configuration as the immediate playout frame. The number of preceding frames, corresponding to pre-roll frames, may correspond to the number of frames needed by a decoder to build up the full signal so as to be in a position to output valid audio sample values associated with the current frame whenever an immediate playout frame is decoded. The full signal may, for example, be built up during start-up or restart of the decoder. The immediate playout frame may be, for example, the first frame upon start-up of the decoder.

And the method may include the step S103 of initializing the decoder if it is determined that the frame is an immediate playout frame. The initializing may comprise decoding the encoded audio sample values comprised by the additional information before decoding the encoded audio sample values associated with the current frame.

Figure 3:
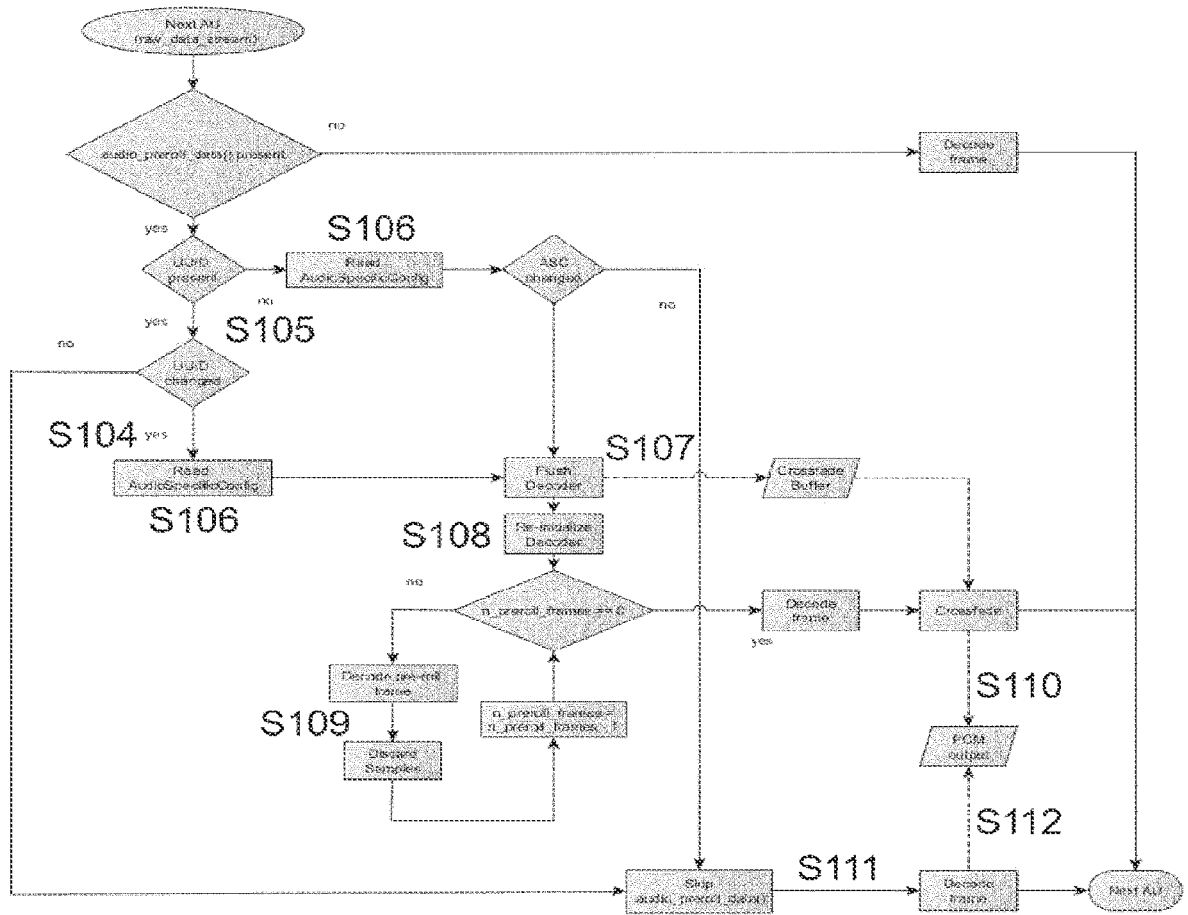
FIG. 3 illustrates a further example of a method for decoding a bitstream of encoded audio data, wherein the bitstream of encoded audio data represents a sequence of audio sample values and comprises a plurality of frames, wherein each frame comprises associated encoded audio sample values.

Referring now to the example of FIG. 3, the audio decoder may be switched from a current codec configuration to a different codec configuration if it is determined that the frame is an immediate playout frame and if the audio sample values of the immediate playout frame have been encoded using the different codec configuration. The immediate playout frame may be decoded using the current codec configuration and the additional information may be discarded if it is determined that the frame is an immediate playout frame and if the audio sample values of the immediate playout frame have been encoded using the current codec configuration.

In one example, the decoding process may utilize elements from IPF decoding in MPEG-D USAC. Referring again to the example of FIG. 3, the decoding process may proceed in detail as follows.

If payload is present and if uuid changed from previous frame (decision at block S104)
OR
If payload is present and uuid is not present (decision at block S105)
 1. Read new stream configuration S106, i.e. AudioSpecificConfig( ) from the audio_preroll_element( )
 2. Flush decoder states and store result in buffer S107, e.g. using a "NULL" access unit
    Store the result in a buffer (Crossfade Buffer)
 3. Re-configure (re-initialize) the decoder S108
 4. Decode n_preroll_frames in audio_preroll_element S109 and discard the output
 5. Decode the next audio element (e.g. SCE/CPE/LFE) in the bitstream and store result in a buffer (Crossfade Buffer B)
    If signaled by flags, apply crossfade S110 between Crossfade Buffer A and decoder output and write the result to the output PCM buffer. The result of the crossfade constitutes the Composition Unit for this frame
    Else write decoder output directly to PCM buffer
 6. Continue with next frame
ELSE
 1. Skip audio_preroll_element( ) and decode frame S111
 2. Write result to PCM buffer S112
The decoding process may further include:
If payload is not present, decode the respective frame and continue with the next frame In one example, this processing may allow switching of AudioObjectTypes (AOT) as defined in ISO/IEC 14496-3 in combination with continuously producing correct output samples and without introducing gaps of silence in the audio output. In one example, the AOTs which are switched in between may include AOT 2 (AAC), AOT 5 (SBR), AOT 29 (PS) and other compatible ones.

Figure 4:
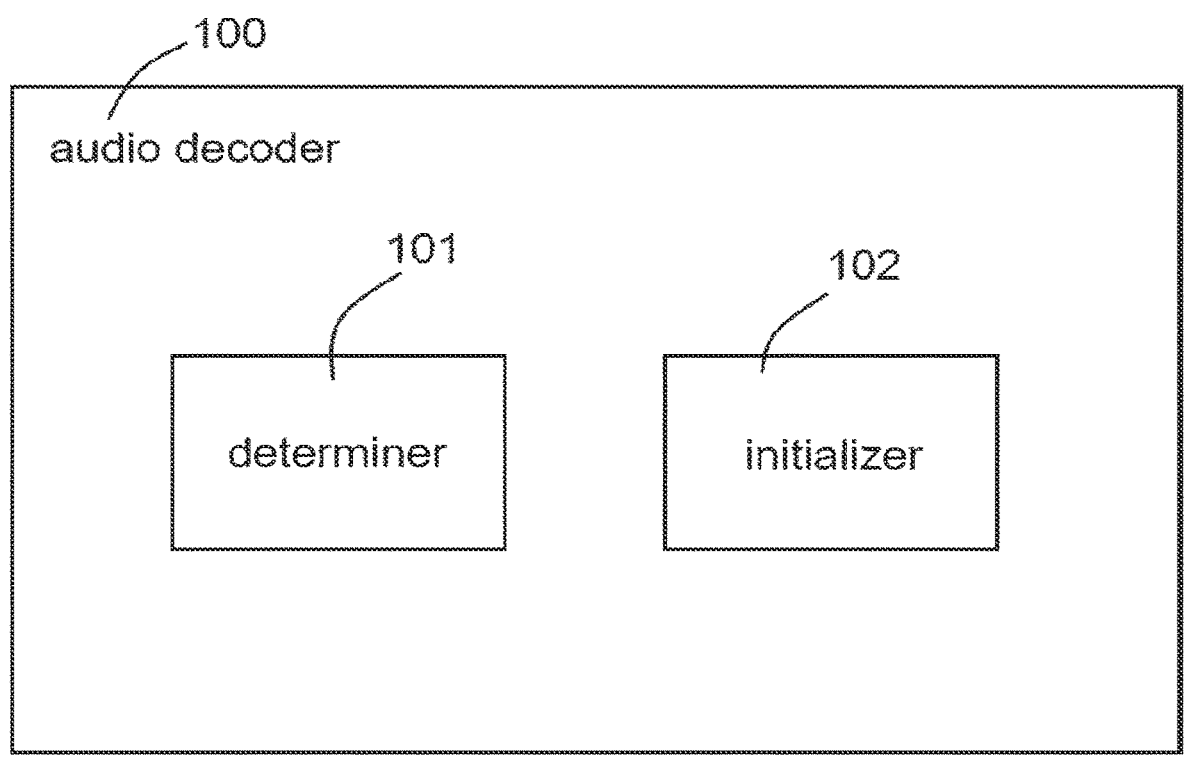
FIG. 4 illustrates an example of an audio decoder for decoding a bitstream of encoded audio data, wherein the bitstream of encoded audio data represents a sequence of audio sample values and comprises a plurality of frames, wherein each frame comprises associated encoded audio sample values.

Referring now to the example of FIG. 4, an aspect of the present invention relates to an audio decoder for decoding of an IPF. The audio decoder 100 may comprise a determiner 101. The determiner 101 may be configured to determine whether a frame of the bitstream of encoded audio data is an immediate playout frame comprising encoded audio sample values associated with a current frame and additional information. The additional information may comprise encoded audio sample values of a number of frames preceding the immediate playout frame. The encoded audio sample values of the preceding frames may be encoded using the same codec configuration as the current frame. The number of preceding frames, corresponding to pre-roll frames, may correspond to the number of frames needed by the decoder 100 to build up the full signal so as to be in a position to output valid audio sample values associated with the current frame whenever an immediate playout frame is decoded. The full signal may, for example, be built up during start-up or restart of the decoder 100. The immediate playout frame may be, for example, the first frame upon start-up of the decoder 100.

And the audio decoder 100 may comprise an initializer 102. The initializer 102 may be configured to initialize the decoder 100 if the determiner 101 determines that the frame is an immediate playout frame. Initializing the decoder 100 may comprise decoding the encoded audio sample values comprised by the additional information before decoding the encoded audio sample values associated with the current frame. The initializer 102 may further be configured to switch the audio decoder 100 from a current codec configuration to a different codec configuration if the determiner 101 determines that the frame is an immediate playout frame and if the audio sample values of the current frame have been encoded using the different codec configuration. And the decoder 100 may be configured to decode the current frame using the current codec configuration and to discard the additional information if the determiner 101 determines that the frame is an immediate playout frame and if the audio sample values of the current frame have been encoded using the current codec configuration.

Figure 5:
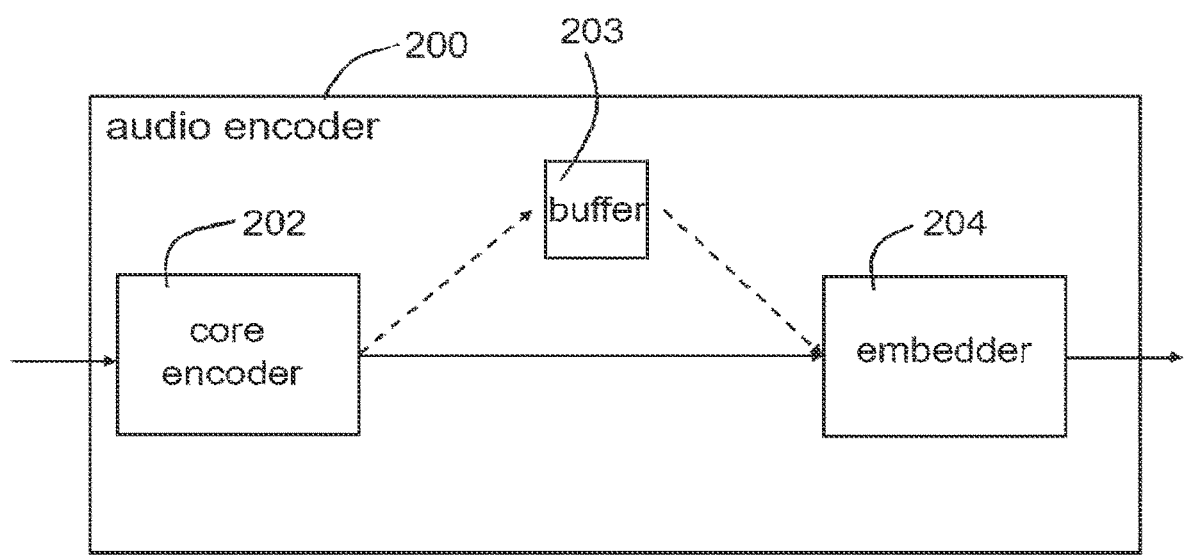
FIG. 5 illustrates an example of an audio encoder for generating a bitstream of encoded audio data with random access points (immediate playout frames, IPFs).

Referring now to the example of FIG. 5, an aspect of the present invention relates to an audio encoder for generating a bitstream of encoded audio data with immediate playout frames (random access points), wherein the bitstream of encoded audio data represents a sequence of audio sample values and comprises a plurality of frames, wherein each frame comprises associated encoded audio sample values.

The audio encoder 200 may comprise a core encoder 202 configured to encode uncompressed audio sample values associated with the plurality of frames using a predefined codec configuration. Using a predefined codec configuration may, for example, include using a predetermined sampling rate. In one example, the core encoder 202 may encode the uncompressed audio samples to be compliant with the decoding of the MPEG-4 Audio standard.

The audio encoder 200 may further comprise a buffer 203 configured to store encoded audio sample values of a number of preceding frames of a current frame of the plurality of frames encoded using the predefined codec configuration (as indicated by the dashed lines).

When encoding e.g. a frame N, the relevant previous frames N−1, N−2, . . . may always be buffered/stored. When instructed to write an IPF in frame N (e.g. every 2 seconds in order to allow dynamic switching) the stored relevant previous frames N−1, N−2, . . . may then be taken and packaged into the current frame N.

And the audio encoder 200 may comprise an embedder 204 configured to write an immediate playout frame in the current frame of the plurality of frames, wherein the immediate playout frame may comprise encoded audio sample values associated with said current frame and additional information corresponding to the encoded audio sample values of the number of preceding frames of said current frame.

While in the example of FIG. 5, the embedder 204 is defined as being part of the audio encoder 200, it is noted that alternatively, or additionally, the embedder 204 may also be implemented individually to write immediate playout frames in any current frame of a bitstream of encoded audio data or to convert immediate playout frames in a bitstream of encoded audio data into "normal" frames by removing the additional information from the immediate playout frames. In this, the embedder 204 may be part of the encoder chain but does not necessarily have to.

In an embodiment, the embedder 204 may further be configured to include information on the predefined codec configuration in the additional information. In this, the additional information may provide information on the predefined codec configuration to a decoder.

In an embodiment, the embedder 204 may further be configured to include in the immediate playout frame the additional information. In this way, the additional information may be transported in the bitstream to the decoder.

In an embodiment, the generated bitstream of encoded audio data may be an MPEG-4 Audio bitstream.

In an embodiment, the embedder 204 may further be configured to embed the additional information in the bitstream (e.g. for transport) via an MPEG-4 Audio bitstream extension mechanism that may be either a Data Stream Element (ID_DSE) or an extension_payload element.

In an embodiment, the embedder 204 may further be configured to locate either the Data Stream Element (ID_DSE) or the extension_payload element at a predefined position in the MPEG-4 Audio bitstream and/or to assign a specific instance tag signaling that a payload of the Data Stream Element (ID_DSE) or the extension_payload element is the additional information. The predefined position may correspond to a first position in the MPEG-4 Audio bitstream, i.e. always the first in the frames as it may carry the decoder configuration that may be needed to decode a frame n (FIG. 1, raw_data_block( )[n]). The decoder may thus assume that if the first element in the frame is an ID_DSE or an extension_payload element (may be contained inside an ID_FIL element) that this element carries pre-roll data (preceding frames, pre-roll frames).

In an embodiment, the embedder 204 may further be configured to include a unique identifier into the additional information. Optionally, the unique identifier may signal the predefined codec configuration. The predefined codec configuration may then be used by the decoder to decode a frame n as stated above. Based on the unique identifier, the decoder may be able to identify the additional information in the bitstream and parse the bitstream accordingly.

In an embodiment, the audio encoder 200 may further be configured to not time-differentially encode or entropy encode an earliest frame of the number of frames comprised in the additional information relative to any frame previous to the earliest frame and the audio encoder 200 may further be configured to not time-differentially encode or entropy encode the immediate playout frame relative to any frame previous to the earliest frame of the number of frames preceding the immediate playout frame or relative to any frame previous to the immediate playout frame.

Figure 6:
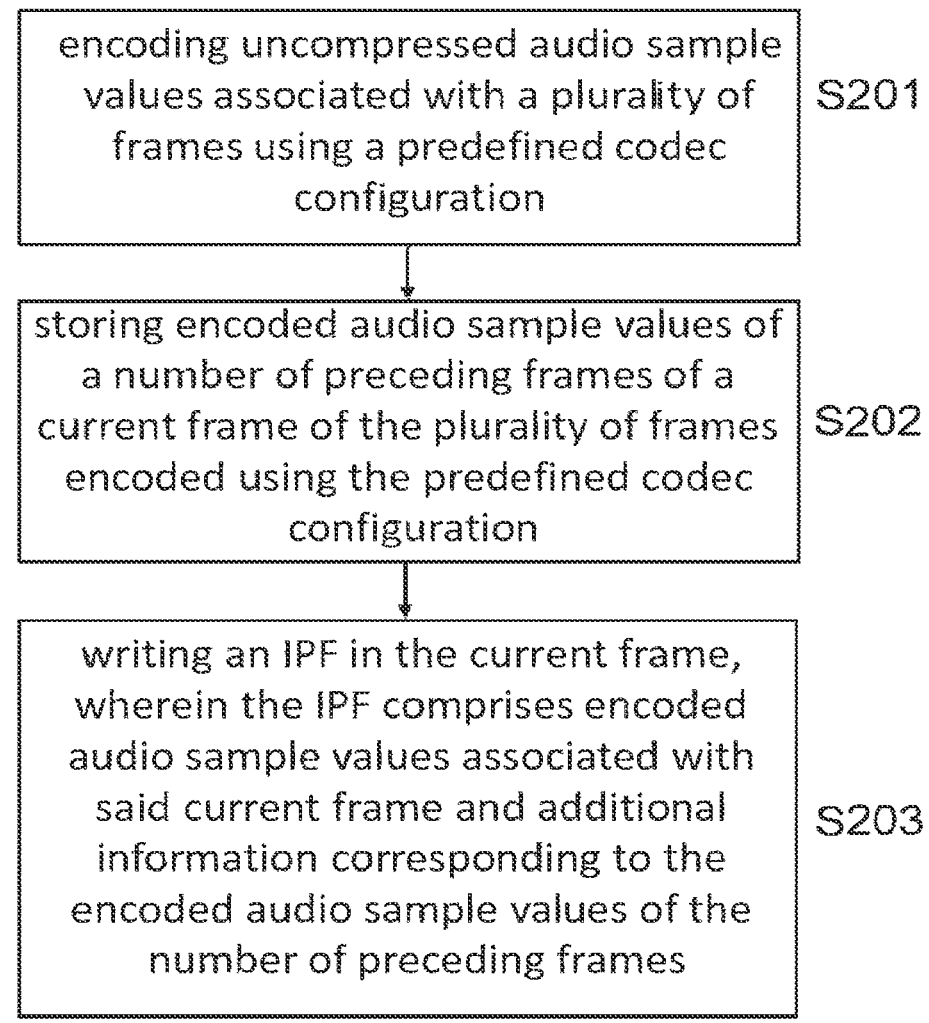
FIG. 6 illustrates an example of a method for generating a bitstream of encoded audio data with random access points (immediate playout frames, IPFs).

Referring now to the example of FIG. 6, an aspect of the present invention relates to a method of generating, by an audio encoder, a bitstream of encoded audio data with immediate playout frames (random access points), wherein the bitstream of encoded audio data represents a sequence of audio sample values and comprises a plurality of frames, wherein each frame comprises associated encoded audio sample values.

The method may comprise the step S201 of encoding, by a core encoder, uncompressed audio sample values associated with the plurality of frames using a predefined codec configuration. Using a predefined codec configuration may, for example, include using a predetermined sampling rate. The method may further comprise the step S202 of storing, by a buffer, encoded audio sample values of a number of preceding frames of a current frame of the plurality of frames encoded using the predefined codec configuration.

And the method may comprise the step S203 of writing, by an embedder, an immediate playout frame in the current frame of the plurality of frames, wherein the immediate playout frame comprises encoded audio sample values associated with said current frame and additional information corresponding to the encoded audio sample values of the number of preceding frames of said current frame.

In an embodiment, the additional information may further comprise information on the predefined codec configuration. The predefined codec configuration may be used by a decoder in the decoding process as detailed above.

In an embodiment, the immediate playout frame may further comprise the additional information. In this way, the additional information may be transported in the bitstream.

In an embodiment, the generated bitstream of encoded audio data may be an MPEG-4 Audio bitstream.

In an embodiment, the additional information may be embedded in the bitstream (e.g. for transport), by the embedder, via an MPEG-4 Audio bitstream extension mechanism that is either a Data Stream Element (ID_DSE) or an extension_payload element. The extension_payload element may, for example, be contained at different places of the MPEG-4 Audio bitstream syntax. In an embodiment, the extension_payload element may be embedded (e.g. for transport), by the embedder, inside a fill element (ID_FIL).

As detailed above, in an embodiment, either the Data Stream Element (ID_DSE) or the extension_payload element may be located, by the embedder, at a predefined position in the MPEG-4 Audio bitstream and/or may be assigned a specific instance tag signaling that a payload of the Data Stream Element (ID_DSE) or the extension_payload element is the additional information. The predefined position may always be the first position in the frames as it may carry the decoder configuration that may be needed to decode the current frame.

In an embodiment, the additional information may further comprise a unique identifier. Optionally, the unique identifier may signal the predefined codec configuration.

In an embodiment, an earliest frame of the number of frames comprised in the additional information may not be time-differentially encoded or entropy encoded, by the audio encoder, relative to any frame previous to the earliest frame and the immediate playout frame may not be time-differentially encoded or entropy encoded, by the audio encoder, relative to any frame previous to the earliest frame of the number of frames preceding the immediate playout frame or relative to any frame previous to the immediate playout frame.

Figure 7:
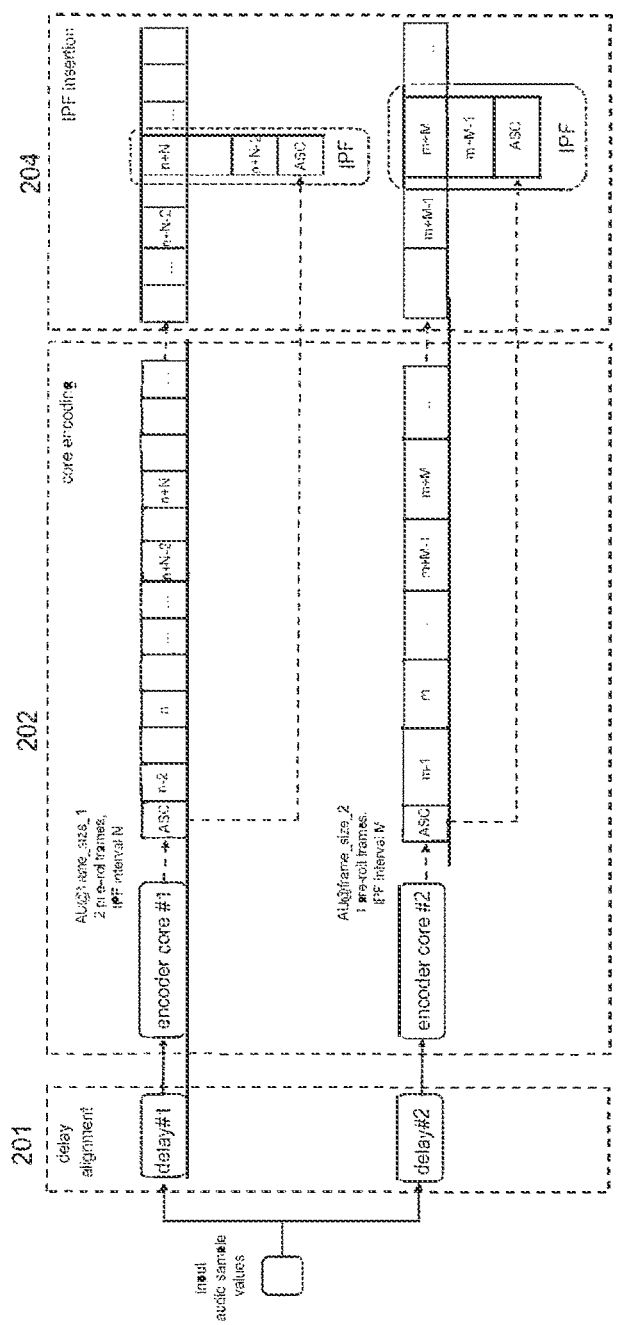
FIG. 7 illustrates an example of a system of audio encoders for generating a plurality of bitstreams of encoded audio data each having time-aligned random access points (immediate playout frames, IPFs).

Referring now to the example of FIG. 7, an aspect of the present invention relates to a system comprising two or more audio encoders for generating a plurality of bitstreams of encoded audio data each having immediate playout frames (time-aligned random access points), wherein each bitstream of encoded audio data represents a sequence of audio sample values and comprises a plurality of frames, and wherein each frame comprises associated encoded audio sample values. While the number of audio encoders in a system is not restricted, in the example of FIG. 7 a system comprising two audio encoders is illustrated. The system may run the two audio encoders in parallel on the same content, inserting immediate playout frames at the same cadence, but having a different configuration, e.g. for bitrate. Each encoding chain may output its own bitstream. Both bitstreams created that way may be stored, for example, on a web-server. A client may start playing back a stream A (e.g. at high bitrate). At some point in time, the client may decide to switch to a lower bitrate stream B, and therefore may request the same content, but in a different bitrate. When the first segment of stream B arrives at a decoder, such a segment may always start with an IPF (this may be signaled e.g. via a manifest file according to MPEG-DASH), which enables the decoder to output correct audio from the very beginning.

Referring again to the example of FIG. 7, two audio encoders are illustrated in parallel, each of the audio encoders comprises a core encoder 202 (encoder core #1, encoder core #2), a buffer (not shown) and an embedder 204 (IPF insertion).

In an embodiment, a predetermined sampling rate may be the same for each of the core encoders 202. Otherwise, resampling and additional delay handling may be needed at the decoder side. However, the core encoders 202 may be configured to run at different frame rates (e.g. AAC-LC 1024; HE-AAC 2048). Further, core encoder configurations may require different number of pre-roll frames p. It may be required that both frame n-p and n are independently decodable, i.e. may not have to rely on information from previous frames (for HE-AAC they may contain the SBR header). After core encoding, the decoding times of IPFs may be aligned across the different streams.

In an embodiment, the system may further comprise a delay alignment unit 201 (delay #1, delay #2) for delay aligning the plurality of bitstreams. For seamless switching at the decoder, the decoding times of immediate playout frames (IPFs) may have to be aligned. The delay alignment stage may delay the input PCM samples (uncompressed audio sample values, input audio sample values) to compensate for different encoder/decoder delays.

Figure 8:
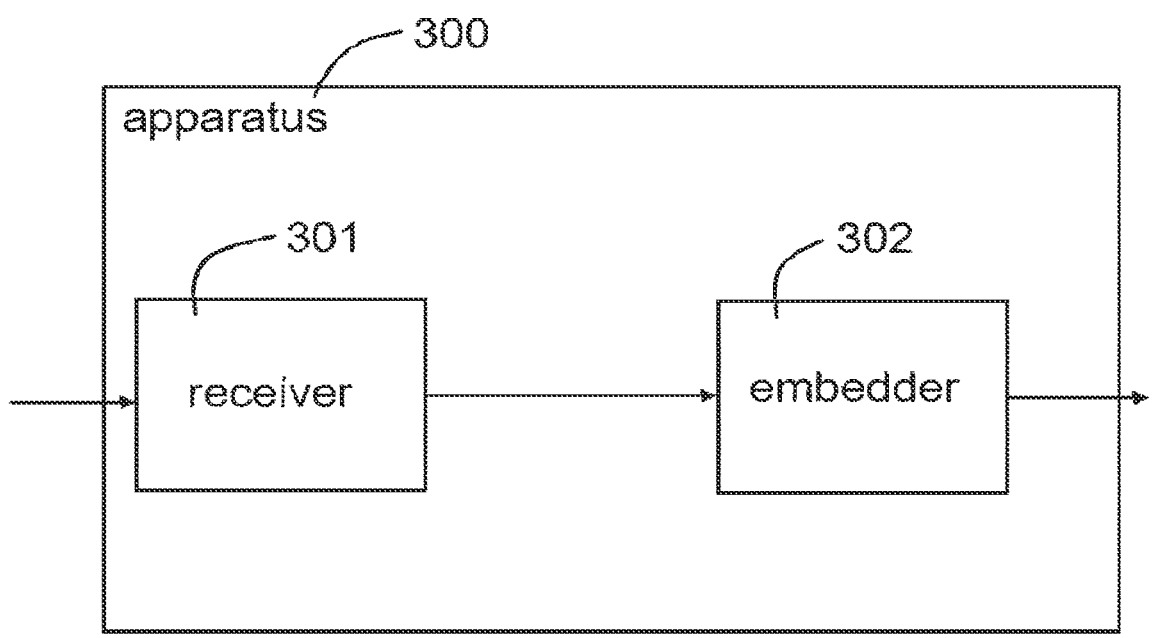
FIG. 8 illustrates an example of an apparatus for generating random access points (immediate playout frames, IPFs) in a bitstream of encoded audio data or for removing random access points (immediate playout frames, IPFs) from a bitstream of encoded audio data.

Referring now to the example of FIG. 8, an aspect of the present invention relates to an apparatus for generating immediate playout frames (random access points) in a bitstream of encoded audio data or for removing immediate playout frames (random access points) from a bitstream of encoded audio data, wherein the bitstream of encoded audio data represents a sequence of audio sample values and comprises a plurality of frames, wherein each frame comprises associated encoded audio sample values.

The apparatus 300 may comprise a receiver 301 configured to receive a bitstream of encoded audio data, wherein the bitstream of encoded audio data represents a sequence of audio sample values and comprises a plurality of frames, wherein each frame comprises associated encoded audio sample values.

And the apparatus 300 may comprise an embedder 302 configured to write an immediate playout frame in a current frame of the plurality of frames, wherein the immediate playout frame comprises encoded audio sample values associated with said current frame and additional information corresponding to encoded audio sample values of a number of preceding frames of said current frame. In generating IPFs, the embedder 302 may operate in compliance with the principles described above in connection with FIGS. 5 to 7. This operation may be said to correspond to converting a "normal" (non-IPF) frame into an IPF.

IPF insertion may take care of the actual copying and packaging. By splitting up core encoding and IPF insertion, as with the above apparatus, it may be possible to store the bitstreams without IPFs and only embed IPFs prior to distribution if needed. If configured for seamless switching, each IPF may have to contain the stream configuration ASC.

In an embodiment, the apparatus 300 may further comprise a buffer configured to store encoded audio sample values of the number of preceding frames of the current frame of the plurality of frames.

In an embodiment, the embedder 302 may further be configured to remove, from the immediate playout frame, the additional information corresponding to the encoded audio sample values of the number of preceding frames of said current frame. This may be said to correspond to converting an IPF into a "normal" frame. For example, an audio encoder may generate IPFs only which may then be removed later by the embedder depending on the constraints that a respective channel/service may have.

Figure 9:
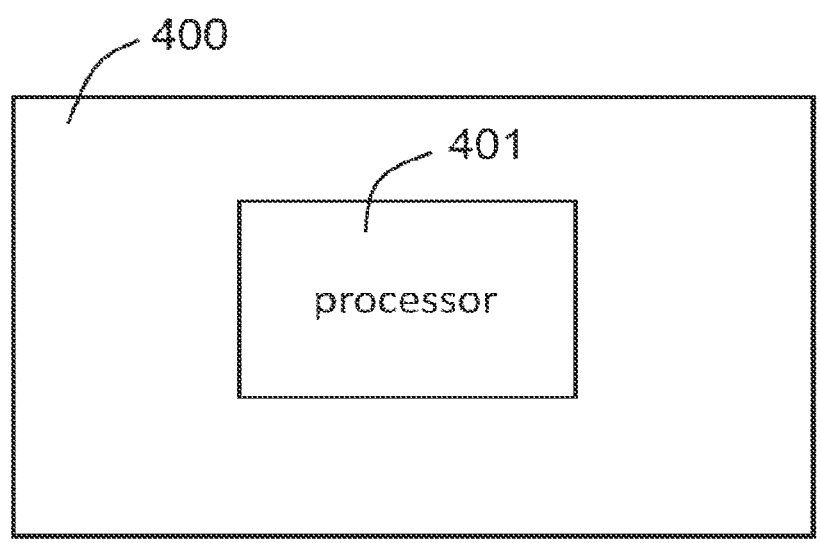
FIG. 9 illustrates an example of a device having a processor for running a computer program stored on a non-transitory digital storage medium.

Referring now to the example of FIG. 9, aspects of the invention may include a non-transitory digital storage medium having a computer program stored thereon to perform methods described herein when said computer program is run by a computer or a processor. FIG. 9 illustrates exemplarily a device 400 having a processor 401 that may run said computer program. Alternatively, the device 400 may represent a respective computer.

The methods and systems described herein may be implemented as software, firmware and/or hardware. Certain components may e.g. be implemented as software running on a digital signal processor or microprocessor. Other components may e.g. be implemented as hardware and/or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods, apparatus and systems described herein are portable electronic devices or other consumer equipment which are used to store and/or render audio signals.

It should be noted that the description and drawings/figures merely illustrate the principles of the proposed methods, systems, and apparatus. Those skilled in the art will be able to implement various arrangements that, although not explicitly described or shown herein, embody the principles of the invention and are included within its spirit and scope. Furthermore, all examples and embodiments outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

The invention claimed is:

1. An audio decoder for decoding a bitstream of encoded audio data, wherein the bitstream of encoded audio data represents a sequence of audio sample values and comprises a plurality of frames, wherein each frame comprises associated encoded audio sample values, the audio decoder comprising:

a determiner configured to determine whether a frame of the bitstream of encoded audio data is an immediate playout frame comprising encoded audio sample values associated with a current frame and additional information, wherein the bitstream of encoded audio data is an MPEG-4 Audio bitstream, wherein the additional information is transported via an MPEG-4 Audio bitstream extension mechanism that is an extension_payload element of a new extension payload element type EXT_AUDIO_PRE_ROLL, wherein the extension_payload element is located at a first position in the MPEG-4 Audio bitstream, and wherein the extension_payload element is contained inside a fill element (ID_FIL),
wherein the additional information comprises encoded audio sample values of a number of frames preceding the immediate playout frame, wherein the encoded audio sample values of the preceding frames are encoded using the same codec configuration as the current frame,
wherein the number of preceding frames, corresponding to pre-roll frames, corresponds to the number of frames needed by the decoder to build up the full signal so as to be in a position to output valid audio sample values associated with the current frame whenever an immediate playout frame is decoded; and
an initializer configured to initialize the decoder if the determiner determines that the frame is an immediate playout frame,
wherein initializing the decoder comprises decoding the encoded audio sample values comprised by the additional information before decoding the encoded audio sample values associated with the current frame,
wherein the initializer is configured to switch the audio decoder from a current codec configuration to a different codec configuration if the determiner determines that the frame is an immediate playout frame and if the audio sample values of the current frame have been encoded using the different codec configuration, and
wherein the decoder is configured to decode the current frame using the current codec configuration and to discard the additional information if the determiner determines that the frame is an immediate playout frame and if the audio sample values of the current frame have been encoded using the current codec configuration.

2. The audio decoder of claim 1, further comprising a crossfader configured to perform crossfading of output sample values acquired by flushing the decoder in the previous codec configuration and output sample values acquired by decoding the encoded audio sample values associated with the current frame.

3. The audio decoder of claim 1, wherein an earliest frame of the number of frames comprised in the additional information is not time-differentially encoded or entropy encoded relative to any frame previous to the earliest frame and wherein the immediate playout frame is not time-differentially encoded or entropy encoded relative to any frame previous to the earliest frame of the number of frames preceding the immediate playout frame or relative to any frame previous to the immediate playout frame.

4. A method for decoding a bitstream of encoded audio data, wherein the bitstream of encoded audio data represents a sequence of audio sample values and comprises a plurality of frames, wherein each frame comprises associated encoded audio sample values, comprising:
determining whether a frame of the bitstream of encoded audio data is an immediate playout frame comprising encoded audio sample values associated with a current frame and additional information, wherein the bitstream of encoded audio data is an MPEG-4 Audio bitstream, wherein the additional information is transported via an MPEG-4 Audio bitstream extension mechanism that is an extension_payload element of a new extension payload element type EXT_AUDIO_PRE_ROLL, wherein the extension_payload element is located at a first position in the MPEG-4 Audio bitstream, and wherein the extension_payload element is contained inside a fill element (ID_FIL),
wherein the additional information comprises encoded audio sample values of a number of frames preceding the immediate playout frame,
wherein the encoded audio sample values of the preceding frames are encoded using the same codec configuration as the immediate playout frame,
wherein the number of preceding frames, corresponding to pre-roll frames, corresponds to the number of frames needed by a decoder to build up the full signal so as to be in a position to output valid audio sample values associated with the current frame whenever an immediate playout frame is decoded;
initializing the decoder if it is determined that the frame is an immediate playout frame, wherein the initializing comprises decoding the encoded audio sample values comprised by the additional information before decoding the encoded audio sample values associated with the current frame;
switching the audio decoder from a current codec configuration to a different codec configuration if it is determined that the frame is an immediate playout frame and if the audio sample values of the immediate playout frame have been encoded using the different codec configuration; and
decoding the immediate playout frame using the current codec configuration and discarding the additional information if it is determined that the frame is an immediate playout frame and if the audio sample values of the immediate playout frame have been encoded using the current codec configuration.

5. The method of claim 4, wherein the bitstream of encoded audio data comprises a first number of frames encoded using a first codec configuration and a second number of frames following the first number of frames and encoded using a second codec configuration, wherein the first frame of the second number of frames is the immediate playout frame.

6. A non-transitory digital storage medium having a computer program stored thereon to perform the method according to claim 4 when said computer program is run by computer or a processor.

7. An audio encoder for generating a bitstream of encoded audio data with immediate playout frames, wherein the bitstream of encoded audio data represents a sequence of audio sample values and comprises a plurality of frames, wherein each frame comprises associated encoded audio sample values, wherein the audio encoder comprises:
a core encoder configured to encode uncompressed audio sample values associated with the plurality of frames using a predefined codec configuration;
a buffer configured to store encoded audio sample values of a number of preceding frames of a current frame of the plurality of frames encoded using the predefined codec configuration; and
an embedder configured to write an immediate playout frame in the current frame of the plurality of frames, wherein the immediate playout frame comprises encoded audio sample values associated with said current frame and additional information corresponding to the encoded audio sample values of the number of preceding frames of said current frame, wherein the generated bitstream of encoded audio data is an MPEG-4 Audio bitstream, wherein the embedder is further configured to embed the additional information in the bitstream via an MPEG-4 Audio bitstream extension mechanism that is an extension_payload element of a new extension payload element type EXT_AUDIO_PRE_ROLL, to locate the extension_payload element at a first position in the MPEG-4 Audio bitstream, and to embed the extension_payload element inside a fill element (ID_FIL).

8. A method of generating, by an audio encoder, a bitstream of encoded audio data with immediate playout frames, wherein the bitstream of encoded audio data represents a sequence of audio sample values and comprises a plurality of frames, wherein each frame comprises associated encoded audio sample values, the method comprising the steps of:

encoding, by a core encoder, uncompressed audio sample values associated with the plurality of frames using a predefined codec configuration;

storing, by a buffer, encoded audio sample values of a number of preceding frames of a current frame of the plurality of frames encoded using the predefined codec configuration; and writing, by an embedder, an immediate playout frame in the current frame of the plurality of frames, wherein the immediate playout frame comprises encoded audio sample values associated with said current frame and additional information corresponding to the encoded audio sample values of the number of preceding frames of said current frame, wherein the generated bitstream of encoded audio data is an MPEG-4 Audio bitstream, wherein the additional information is embedded in the bitstream, by the embedder, via an MPEG-4 Audio bitstream extension mechanism that is an extension_payload element of a new extension payload element type EXT_AUDIO_PRE_ROLL, wherein the extension_payload element is located, by the embedder, at a first position in the MPEG-4 Audio bitstream, and wherein the extension_payload element is embedded, by the embedder, inside a fill element (ID_FIL).

9. The method of claim 8, wherein the additional information further comprises information on the predefined codec configuration.

10. The method of claim 8, wherein the immediate playout frame further comprises the additional information.

11. The method of claim 8, wherein the extension payload element is assigned, by the embedder, a specific instance tag signaling that a payload of the extension payload element is the additional information.

12. The method of claim 8, wherein the additional information further comprises a unique identifier, and wherein optionally the unique identifier signals the predefined codec configuration.

13. The method of claim 8, wherein, by the audio encoder, an earliest frame of the number of frames comprised in the additional information is not time-differentially encoded or entropy encoded relative to any frame previous to the earliest frame and wherein, by the audio encoder, the immediate playout frame is not time-differentially encoded or entropy encoded relative to any frame previous to the earliest frame of the number of frames preceding the immediate playout frame or relative to any frame previous to the immediate playout frame.

* * * * *